United States Patent [19]
Allen et al.

[11] Patent Number: 5,835,946
[45] Date of Patent: Nov. 10, 1998

[54] HIGH PERFORMANCE IMPLEMENTATION OF THE LOAD RESERVE INSTRUCTION IN A SUPERSCALAR MICROPROCESSOR THAT SUPPORTS MULTI-LEVEL CACHE ORGANIZATIONS

[75] Inventors: Michael S. Allen; Brad B. Beavers; Robert Alan Cargnoni; Jose Melanio Nunez; David W. Todd; Jen-Tian Yen, all of Austin, Tex.

[73] Assignee: International Business Machines Corporation, Armonk, N.Y.

[21] Appl. No.: 634,907

[22] Filed: Apr. 18, 1996

[51] Int. Cl.[6] ............................. G06F 12/00; G06F 13/00
[52] U.S. Cl. .............................. 711/122; 711/118; 711/3; 395/800.01
[58] Field of Search .......................... 364/DIG. 1, 243.4; 711/118, 122, 125, 3, 100, 117, 152; 395/800.01

[56] References Cited

U.S. PATENT DOCUMENTS

| | | | |
|---|---|---|---|
| 5,058,006 | 10/1991 | Durdan et al. | 711/118 |
| 5,170,476 | 12/1992 | Laakso et al. | 711/118 |
| 5,214,765 | 5/1993 | Jensen | 711/118 |
| 5,241,641 | 8/1993 | Iwasa et al. | 711/122 |
| 5,261,071 | 11/1993 | Lyon | 711/122 |
| 5,345,576 | 9/1994 | Lee et al. | 711/122 |
| 5,375,216 | 12/1994 | Mayer et al. | 711/122 |
| 5,396,604 | 3/1995 | DeLano et al. | 395/375 |
| 5,455,925 | 10/1995 | Kitahara et al. | 711/122 |
| 5,524,233 | 6/1996 | Milburn et al. | 711/141 |
| 5,530,832 | 6/1996 | So et al. | 711/122 |
| 5,561,779 | 10/1996 | Jackson et al. | 711/122 |
| 5,590,309 | 12/1996 | Chencinski et al. | 711/122 |
| 5,603,004 | 2/1997 | Kurpanek et al. | 711/122 |

Primary Examiner—Tod R. Swann
Assistant Examiner—Tuan V. Thai
Attorney, Agent, or Firm—Sawyer & Associates; Casimer K. Salys

[57] ABSTRACT

The present invention provides a system and method for efficient execution of load reserve (LARX) and store conditional (STCX) instructions in a superscalar processor. A system for efficiently providing a LARX instruction in a superscalar processor is disclosed. The system comprises a data cache (Dcache) for receiving the LARX instruction. The data cache further includes a decoder means for setting and resetting of a validation of the load reserve instruction, an internal cache for receiving address information and for providing data. The system also includes a register means for receiving the LARX instruction and a controller means for providing a physical address based upon the address information. The system provides for the validation being accomplished in one cycle for the LARX instruction when there is a hit on the internal data cache.

7 Claims, 3 Drawing Sheets

HIGH PERFORMANCE IMPLEMENTATION OF THE LOAD RESERVE INSTRUCTION IN A SUPERSCALAR MICROPROCESSOR THAT SUPPORTS MULTI-LEVEL CACHE ORGANIZATIONS

FIELD OF THE INVENTION

The present invention relates generally to an improvement in a superscalar microprocessor and more particularly to improvement in the performance of such a microprocessor when executing load reserve (LARX) or store conditional (STCX) instructions.

BACKGROUND OF THE INVENTION

A conventional superscalar microprocessor in the server market is designed to provide high performance at the expense of increased complexity and functionality. From a memory hierarchy point of view, the conventional superscalar multiprocessor supports a three-level cache organization: internal cache (L1), on-chip controller for controlling internal or external Level 2 (L2) cache, and support of external Level 3 (L3) cache. This three level caching support in the multiprocessor system (MP) environment makes the efficient implementation of a LARX instruction a challenge.

In a conventional superscalar microprocessor's implementation, a data cache (Dcache) unit controls the first level cache, and a Bus Interface Unit (BIU) handles the second level cache and bus snooping activities. Since conventional superscalar microprocessor-based systems will frequently have the multiprocessor capability, Load Reserve/Store Conditional (LARX/STCX) instructions are used very frequently by different processors for the purpose of data sharing. For example, if two processors want to access and modify a shared location at the same time, they have to first set their individual local reservation which is usually located in the BIU. Then only one processor can succeed in executing the STCX instruction which will clear the other processor's reservation. The reason why the reservation is controlled by the BIU in the conventional superscalar microprocessor is because the BIU is responsible for all the bus snooping activities in a multiprocessor system. Therefore, after a STCX instruction is snooped by the BIU, the local reservation will be cleared by the BIU if the STCX instruction completes successfully on the bus. The disadvantage of this method is the slow setting of the reservation in the BIU for the LARX instruction that produces a hit (data is found) in the first level cache because the Dcache unit has to access the BIU to set the reservation in a Power PC™ architecture (a penalty of 6–12 extra processor cycles for a conventional superscalar microprocessor). This prevents fast setting of a lock for entrance to the critical section to update the shared data.

What is needed, therefore, is a system and method for improving the performance of a microprocessor, by efficiently implementing the LARX instruction. The present invention addresses such a need.

SUMMARY OF THE INVENTION

The present invention provides a system and method for efficient execution load reserve (LARX) and store conditional (STCX) instructions in a superscalar processor. A system for efficiently providing a (LARX/STCX) instruction execution in a superscalar processor is disclosed. The system comprises a data cache (Dcache) for receiving LARX instructions. The data cache further includes a decoder means for setting and resetting a validation of a LARX instruction, and an internal cache for receiving address information and for providing data. The system also includes a register means for receiving the LARX instruction and a controller means for providing a physical address based upon the address information. The system provides the validation in one cycle when there is a hit on data in the internal data cache.

The speed of the execution of the LARX instruction is increased by having the reservation bit/address controlled by the data cache unit. When there is a hit on data in the first level cache, the setting of the reservation can be accomplished in one cycle (6–12 processor cycles faster than with conventional superscalar microprocessors where the reservation is set by the BIU). If the hit ratio on the internal cache is high, the performance of microprocessor is increased significantly for those applications that use a LARX/STCX instruction loop frequently. In addition, there is no performance loss in the handling of a snooped STCX instruction in multiprocessor system. That is, the clearing of the reservation can be done as before by previous implementation without longer latency. Moreover, as a good side-effect, no LARX instruction-reserve operation will be issued from the data cache to the BIU in systems in which a third level (L3) cache is not required to maintain the reservation, or any system in which the L3 cache is disabled. Typically, additional control signals between the data cache and the bus interface unit are required to handle the snooped STCX instruction operations in a system. These additional control signals can be added without affecting the latency or performance of the microprocessor.

This performance improvement is especially important for providing efficient locking mechanisms for the PowerPC™ architecture in a multiprocessor system. The improvement can be justified by the high hit ratio of the data cache (32 Kbytes) in the conventional superscalar microprocessor because over 90 percent of the LARX instructions can be completed in the data cache in just one cycle.

DESCRIPTION OF THE INVENTION

The present invention relates to an improvement in a superscalar processor architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
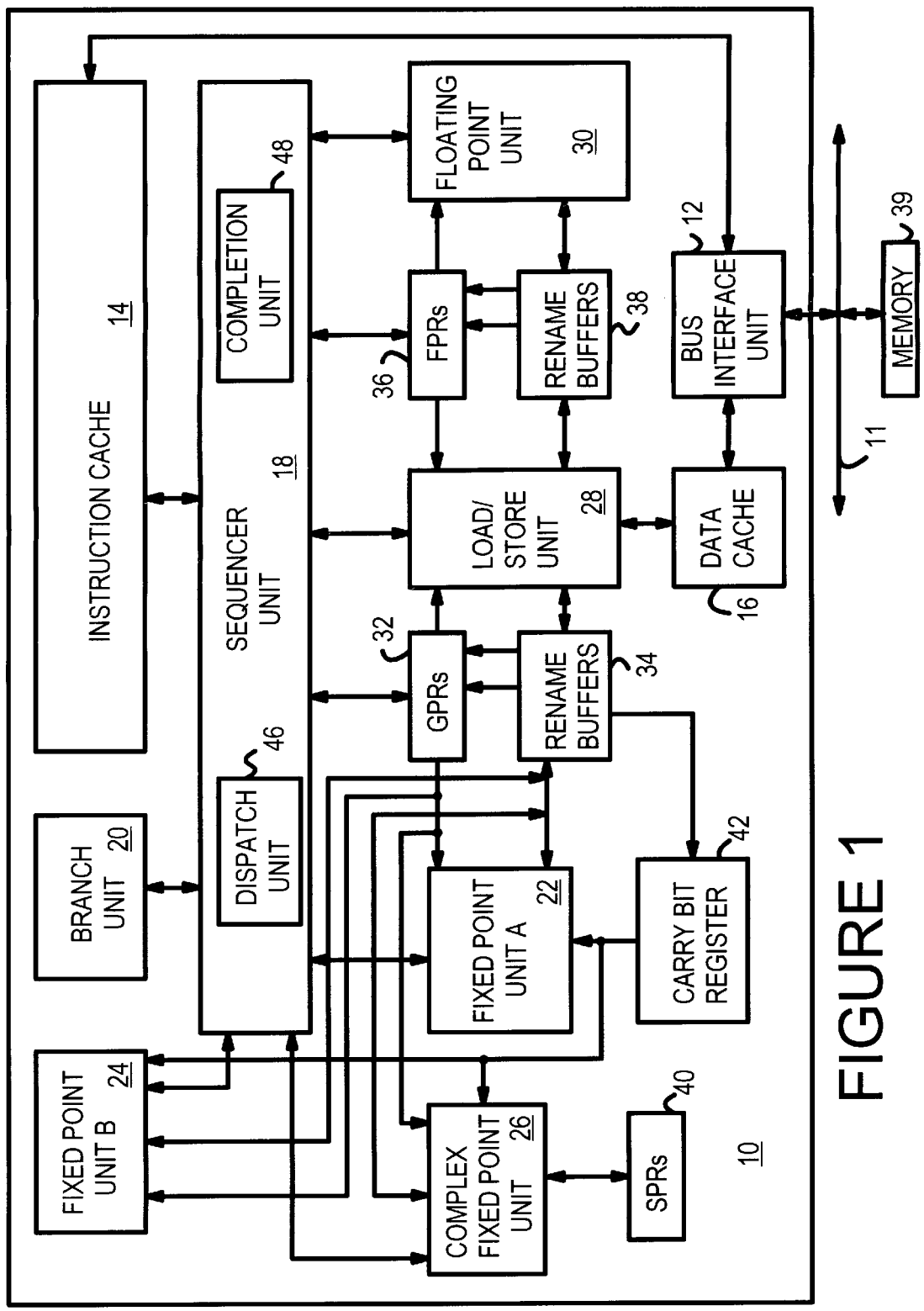
FIG. 1 is a block diagram of a processor system for processing information according to the preferred embodiment.

FIG. 1 is a block diagram of a processor 10 for processing information according to the preferred embodiment. In the preferred embodiment, processor 10 is a monolithic integrated circuit (IC) superscalar microprocessor, such as the PowerPC™ processor from IBM Corporation, Austin, Tex. Accordingly, as discussed further hereinbelow, processor 10 includes as part of the IC circuitry various instruction execution units such as registers, buffers, memories, etc. Also, in the preferred embodiment, processor 10 operates according to a reduced instruction set computing (RISC) techniques. As shown in FIG. 1, a system bus 11 is connected to a BIU 12 of processor 10. The BIU 12 controls the transfer of information between processor 10 and system bus 11.

The BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

The sequencer unit 18 includes execution units of a dispatch unit 46 and a completion unit 48. In the preferred embodiment, the execution circuitry of processor 10 includes also a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand(s) information from general purpose registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point registers ("FPRs") 36 and floating point rename buffers 38. FPU 30 outputs results (destination operand information) of its operation for storage at selected entries in floating point rename buffers 38.

Processor 10 achieves high performance by processing multiple instructions concurrently at the various execution units 20, 22, 24, 26, 28 and 30. Accordingly, each instruction is processed as a sequence of stages, each stage being executable in parallel with stages of other instructions. Such a technique is called "superscalar pipelining". In the preferred embodiment, an instruction is normally processed as six stages, namely fetch, decode, dispatch, execute, completion, and writeback.

Typically, in a conventional superscalar processor, in response to a Load instruction LSU 28 loads information from data cache 16 and copies such information into one of the rename buffers 34 and 38. If such information is not stored in data cache 16, then data cache 16 inputs (through the BIU 12 and system bus 11) such information from a system memory 39 connected to system bus 11. Moreover, data cache 16 is able to output (through the BIU 12 and system bus 11) information from data cache 16 to system memory 39 connected to system bus 11. In response to a store instruction, LSU 28 loads information from one of the GPRs 32 and FPRs 36 and stores such information in data cache 16.

In a conventional superscalar processor architecture such as the PowerPC™ architecture, update of a storage location can be implemented by using the Load Reserve (LARX) and Store Conditional (STCX) instructions. In addition to loading the requested data, LARX instruction also sets the reservation in the requesting processor based on the issued real address. The reservation can then be cleared by a subsequent STCX instruction from the same processor, or store operations to the same reservation granule (to the same real cache line address) from other processors. That is, a STCX instruction from the requesting processor performs a store to the target storage location only if another processor or mechanism store operation has not intervened between execution of the LARX instruction and the STCX instruction. With this definition, the combination of LARX instruction and STCX can be used to construct a semaphore or locking mechanism for the entrance to a critical section shared by different processes or processors.

The following example illustrates how programmers can use LARX/STCX instruction to build a locking primitive:

```
loop: lwarx    r5, 0, r3    # load from cache and reserve
      cmpwi    r5, 0x0      # check if r5 is zero or not (if the reserve lock is set or not)
      bne loop              # if r5 is not equal to 0 (reserve lock is set), then branch
                              back to "loop"
      stwcx r1, r0, r3      # try to store a non-zero value (set the lock) in r3
      bne loop              # if STCX instruction is not successful, branch
                              back to "loop"
      Critical_section      # Enter the critical section if the STCX
      instruction is successful
```

From the example above, the efficient execution of the LARX and STCX instructions determines how quickly each process can enter the critical section. This is very important in today's applications, especially in a multiprocessor system, due to the requirement of data sharing. In this example, "cmpwi" and "bne" can be executed in one cycle, and "stwcx" can also be executed in one cycle if the data cache state is modified. If "lwarx" cannot be executed with similar latency, then this instruction becomes the performance limiting factor of the locking primitive for the entrance to the critical section. To more particularly describe this problem in the context of a conventional superscalar microprocessor, refer to the following discussion.

Figure 2:
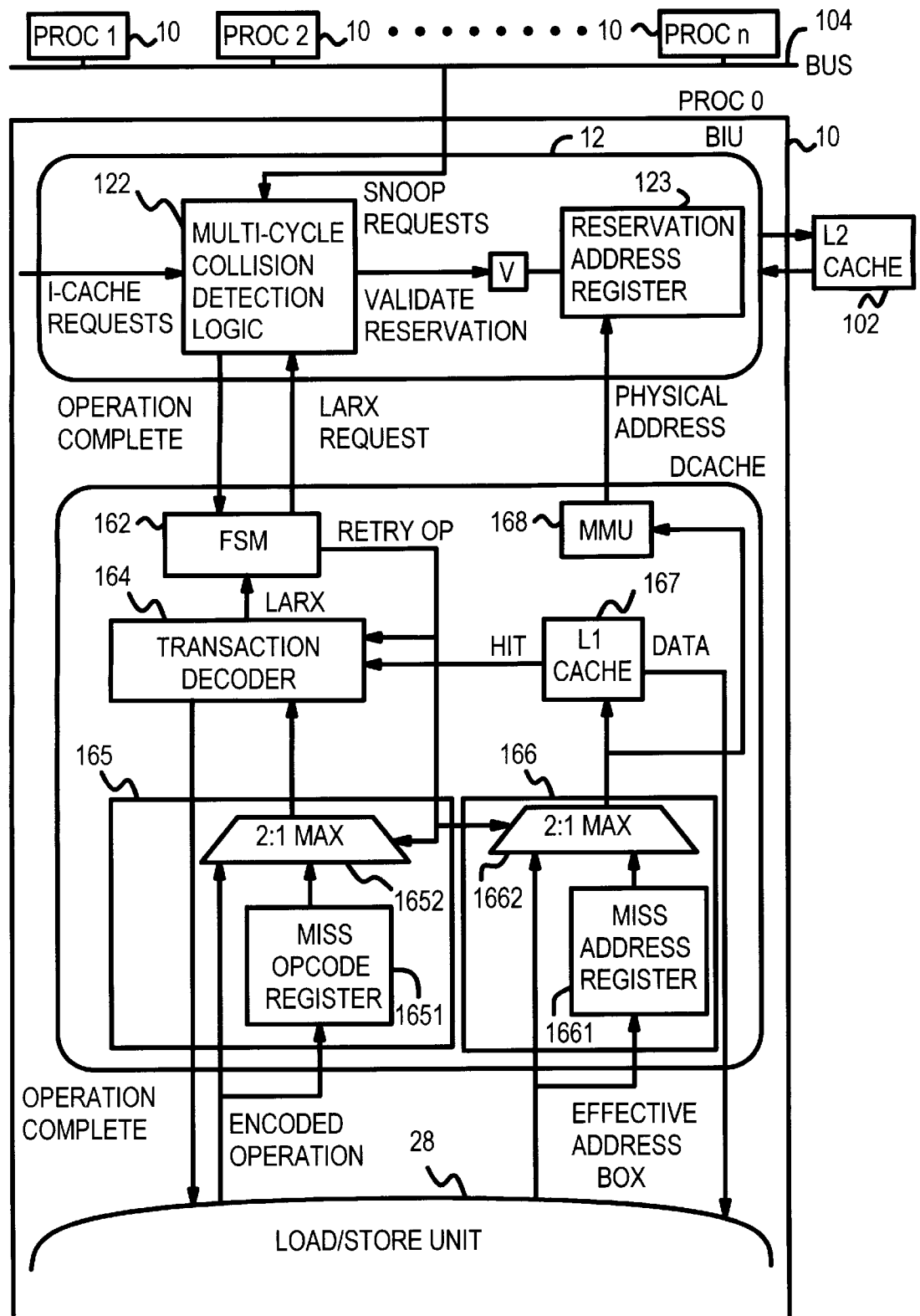
FIG. 2 is a block diagram of how a load reserve (LARX) instruction is provided in a conventional implementation of a superscalar processor.

FIG. 2 is a block diagram of how a LARX instruction is provided in a conventional implementation of a superscalar processor. What is shown are the key portions of a bus interface unit (BIU) 12, data cache (Dcache) 16, an off-chip L2 cache 102 and partial view of Load/Store unit 28. In this implementation, the processor 10 is coupled in a multiprocessor architecture with a plurality of other processors 10 via a bus 104. As is seen there are snoop requests and I-cache requests which are provided to multi-cycle collision detection logic (MCDL) 122 of the BIU 12. The BIU 12 also receives signals from second level external (L2) cache 102. The MCDL 122 validates the reservation in reservation address register 123.

The Dcache 16 includes a Finite State Machine (FSM) 162 which receives signals from MCDL 122, transaction decoder 164, an internal (L1) cache, first and second multiplexer arrangements 165 and 166 and LSU 28. The first multiplexer arrangement 165 includes a miss opcode register 1651 coupled to a 2/1 multiplexer 1652 for providing encoded information to the transaction decoder 164 from LSU 28. The second multiplexer arrangement 166 includes miss address register 1661 coupled to a 2/1 multiplexer 1662. Both of the 2/1 multiplexers 1652 and 1662 receive a retry operation signal from FSM 162.

The second multiplexer arrangement provides signals to L1 cache 167 and a memory management unit (MMU) 168. The MMU 168 provides a physical address to reservation address register 123. If there is a hit in the L1 cache 167 (that is, the appropriate data is present in the L1 cache), that data is provided to LSU 28.

In this operation, a LARX instruction is decoded by the Transaction decoder 164 which would activate the FSM 162. The FSM 162 would then provide a LARX instruction request to the MCDL 122 of the BIU 12. After several cycles, the BIU 12 signals "operation complete" and the LARX instruction is then retried internally in the Dcache 16 in order to return data back to the LSU 28. In the PowerPC™ architecture, the data and the completion signal back to the LSU 28 take anywhere from 9 to 15 cycles from the time the instruction is received from the LSU 28. In this scheme, a penalty is always paid for having to go out to the BIU 12 and retrying the instruction internally to return data to the load store unit 28.

Accordingly, to speed up the execution of the LARX instruction, a system and method in accordance with the present invention provides for controlling the setting and resetting of a local reservation within the Dcache 16 rather than through the use of the BIU 12. In so doing, for hits on the internal (L1) cache in a two-level cache system, the setting of reservation can be accomplished in one cycle. Accordingly, in those instances where there are multiple LARX/STCX instructions, the present invention significantly improves the performance of the processor.

Figure 3:
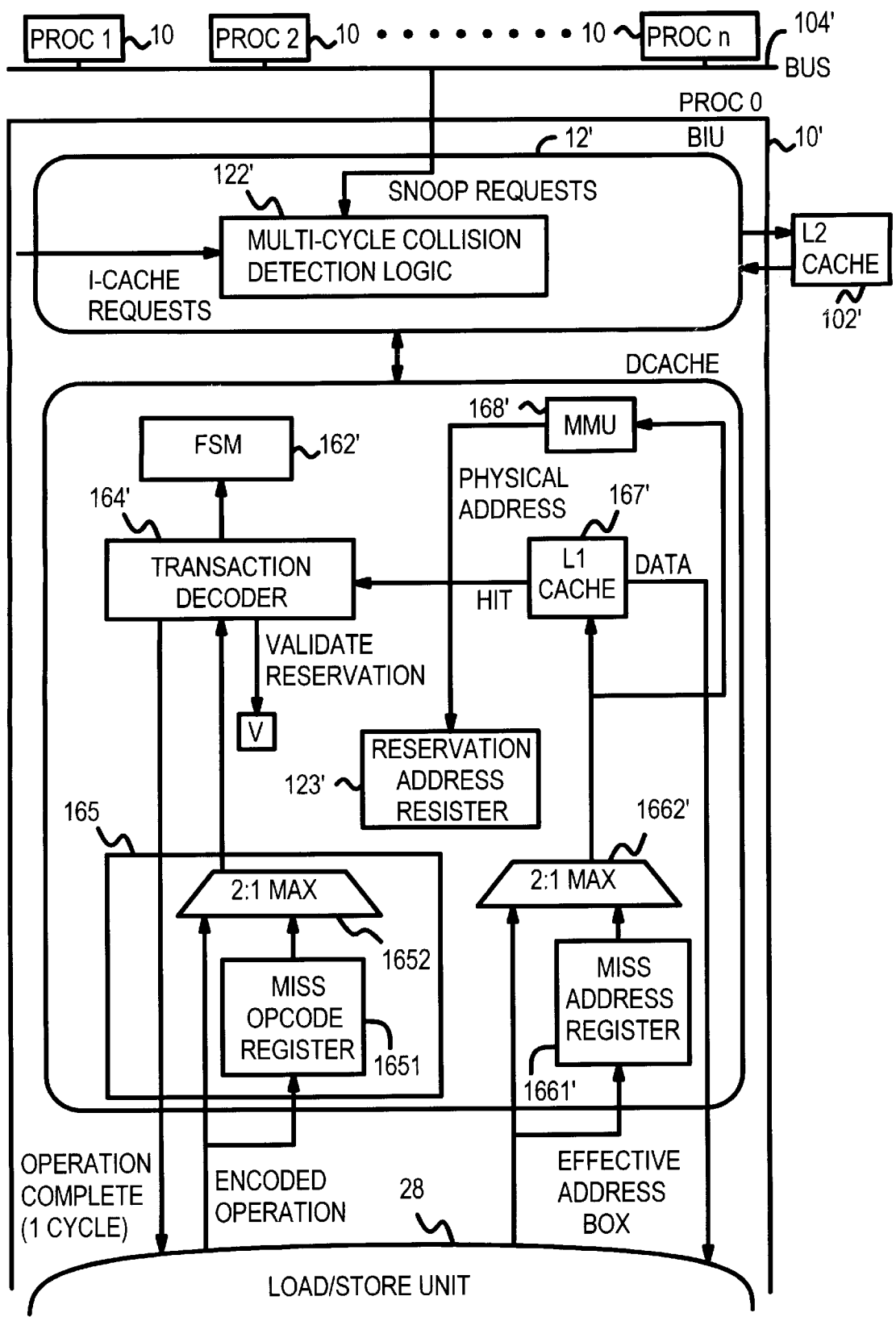
FIG. 3 is a block diagram of an implementation of the LARX instruction in accordance with the present invention.

To more particularly describe the features of the present invention, refer now to FIG. 3 which is a block diagram of an implementation of the LARX instruction in accordance with the present invention.

Referring now to FIG. 3, the present invention is utilized advantageously in a system in which there is no L3 cache, or a system with an L3 cache which doesn't require the lowest level of caching to maintain the reservation (lowest level in this case meaning the L3 cache). As is also seen, all of the elements shown in FIG. 2 are similar to those shown in FIG. 3. The primary and inventive difference between the two embodiments is that the reservation address register is in the Dcache 16' rather than in the BIU 12'. In so doing, the cycle time to complete a LARX instruction has been significantly improved. In this scheme, the validation of the reservation register has the same one cycle latency timing as a load with a hit in the data cache. The reservation is maintained in the Dcache 16' which now handles the setting and resetting of the reservation via operation of the transaction decoder 164'. The benefits are a single cycle LARX instruction execution and one less request type to tie up the BIU's 12' multi-cycle collision detection logic 122'. Typically, additional control signals and extra logic (not shown) are needed between Dcache 16' and the BIU 12' to handle the snooped STCX instruction operations in a multiprocessor system. However, these additional control signals and logic can be added without affecting the latency or performance of the microprocessor.

Overall comparisons

The amount of logic added in the new implementation in accordance with the present invention is negligible compared to that of the previous implementation. In addition, for STCX instruction operations in the uniprocessor/multiprocessor system, the performance is the same as before from the master's perspective. The new implementation retail the same operation advantage of a conventional multiprocessor system while improving the system performance in the execution of LARX instructions. In addition, the new implementation is a more straightforward design because Dcache 16' does not need extra signals from the BIU 12' to tell it if the STCX instruction has succeeded, or when to set the reservation for the LARX instruction operation.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

We claim:

1. In a system having a superscalar processor, the superscalar processor is configured for efficiently providing a load reserve (LARX) instruction execution, the superscalar processor includes a data cache (Dcache) for receiving the LARX instruction, the data cache further comprising:

register means for receiving the LARX instruction;

decoder means for setting and resetting a validation of the LARX instruction;

controller means for providing a physical address of data based upon address information, the controller means further including a reservation address register wherein the physical address is stored in the reservation address register; and an internal cache for receiving the address information and for providing the data, wherein control over the setting and resetting of the validation and over the storing of the physical address for creating a local reservation locking out access to the physical address is internal to the Dcache rather than external thereto for eliminating cycle times of a Dcache request for and a Dcache retry of the LARX instruction and providing the validation in a single cycle when there is a hit on the internal cache.

2. The system of claim 1 in which at least one superscalar processor includes a second level external cache.

3. The system of claim 2 in which any cache beyond the external cache is disabled.

4. The system of claim 3 in which a third level external cache is not required to maintain the reservation.

5. The system of claim 1 in which the controller comprises a memory management unit.

6. The system of claim 5 in which the register means comprises a reservation address register.

7. The system of claim 6 in which the decoder means comprises a transaction decoder.

* * * * *